United States Patent
Yasuda et al.

(10) Patent No.: US 9,587,569 B2
(45) Date of Patent: Mar. 7, 2017

(54) CONTROL DEVICE FOR SPARK-IGNITION ENGINE

(71) Applicant: MAZDA MOTOR CORPORATION, Hiroshima (JP)

(72) Inventors: Kyohei Yasuda, Hiroshima (JP); Takafumi Nishio, Otake (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/783,690

(22) PCT Filed: Apr. 3, 2014

(86) PCT No.: PCT/JP2014/001944
§ 371 (c)(1),
(2) Date: Oct. 9, 2015

(87) PCT Pub. No.: WO2014/171094
PCT Pub. Date: Oct. 23, 2014

(65) Prior Publication Data
US 2016/0069281 A1 Mar. 10, 2016

(30) Foreign Application Priority Data
Apr. 15, 2013 (JP) .................. 2013-084715

(51) Int. Cl.
*F02D 41/06* (2006.01)
*F02D 19/08* (2006.01)
(Continued)

(52) U.S. Cl.
CPC ....... *F02D 19/084* (2013.01); *F02D 41/0025* (2013.01); *F02D 41/06* (2013.01);
(Continued)

(58) Field of Classification Search
CPC .... F02D 19/08; F02D 19/084; F02D 41/0025; F02D 41/06; F02D 41/068; F02D 41/402; Y02T 10/44; Y02T 10/36
See application file for complete search history.

(56) References Cited

U.S. PATENT DOCUMENTS 6,347,612 B1 * 2/2002 Nishimura .......... F02D 41/0002
123/295
6,478,007 B2 * 11/2002 Miyashita ............. F02B 23/104
123/179.16

FOREIGN PATENT DOCUMENTS

| JP | 2009-221963 A | 10/2009 |
| JP | 2010-37968 A | 2/2010 |
| JP | 2010-133288 A | 6/2010 |

OTHER PUBLICATIONS

International Search Report and Written Opinion from PCT/JP2014/001944 dated Jun. 17, 2014.

* cited by examiner

*Primary Examiner* — Hieu T Vo
(74) *Attorney, Agent, or Firm* — Studebaker & Brackett PC (57) ABSTRACT

If an engine body is under a load greater than a predetermined load, a controller selects a first fuel feeding mode in which more fuel is fed during a compression stroke than during an intake stroke if the engine body has a temperature equal to or below a predetermined temperature, and selects a second fuel feeding mode in which more fuel is fed during the intake stroke than during the compression stroke if the temperature of the engine body is higher than the predetermined temperature. Immediately after a switch from the first fuel feeding mode to the second fuel feeding mode as the temperature of the engine body rises, the controller sets a (Continued)

correction factor for making an augmenting correction to a fuel amount to be greater than that before the switch.

3 Claims, 5 Drawing Sheets

(51) Int. Cl.
  *F02D 41/40* (2006.01)
  *F02D 41/00* (2006.01)
(52) U.S. Cl.
  CPC ......... *F02D 41/068* (2013.01); *F02D 41/402* (2013.01); *Y02T 10/36* (2013.01); *Y02T 10/44* (2013.01)

CONTROL DEVICE FOR SPARK-IGNITION ENGINE

TECHNICAL FIELD

The present disclosure relates to a control device for a spark-ignition engine, and more particularly relates to a control device for a spark-ignition engine configured to be fed with a fuel including an unconventional fuel having, at or below a specific temperature, a lower vaporization rate than gasoline.

BACKGROUND ART

In recent years, biofuels have caught some attention from the viewpoint of environmental issues such as global warming. As a result, flexible fuel vehicles (FFVs) that can run with a fuel including gasoline and bioethanol, for example, at any arbitrary blend ratio have already been put on the market. Ethanol contents of fuels for FFVs vary depending on the blend ratio of gasoline and ethanol for the fuels available on the market. Examples of such variations range from E25 (i.e., a blend of 25% ethanol and 75% gasoline) to E100 (i.e., 100% ethanol), or from E0 (i.e., 100% gasoline) to E85 (i.e., a blend of 85% ethanol and 15% gasoline). Note that E100 here includes E100 containing approximately 5% of water (i.e., 5% water and 95% ethanol) that has not been sufficiently removed through the distillation processes of ethanol which is still left there.

Figure 2:
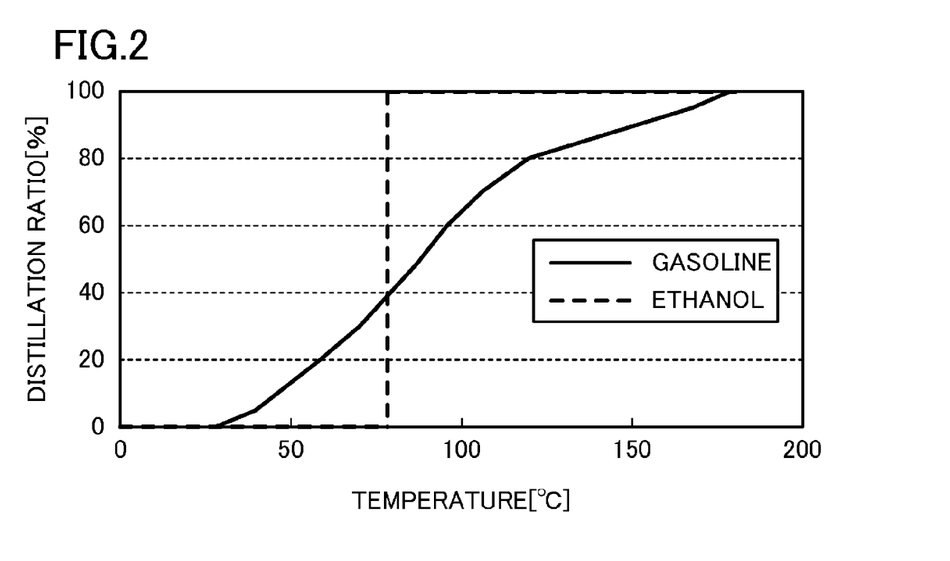
FIG. 2 shows, in comparison, how the respective distillation ratios of gasoline and ethanol change with the temperature.

In such FFVs, the properties of their fuels vary depending on the ethanol content of the fuels. In other words, gasoline, which is a multicomponent fuel, has a boiling point falling within the range of 27° C. to 225° C. FIG. 2 shows a change in the distillation ratio of gasoline with temperature. As can be seen from FIG. 2, the vaporization ratio of gasoline is relatively high even if its temperature is relatively low. In contrast, ethanol, which is a single component fuel, has a boiling point of 78° C. Thus, ethanol at a relatively low temperature has a vaporization rate of 0%, which is lower than that of gasoline. On the other hand, ethanol at a relatively high temperature has a vaporization rate of 100%, which is higher than that of gasoline. Hence, when the engine temperature is low, i.e., equal to or lower than a predetermined temperature, the fuel vaporizability in a cylinder decreases as the ethanol content of the fuel rises or the engine temperature falls. Specifically, if the vaporization rate is defined as the ratio by weight of the fuel contributing to combustion to the fuel fed into the cylinder, the vaporization rate decreases as the ethanol content rises or as the engine temperature falls. When the engine is run cold with E100, for example, there arises a problem that the low vaporization rate causes deterioration in ignitability and/or combustion stability of an air-fuel mixture. In particular, this problem is serious with the water-containing E100.

For example, PATENT DOCUMENT 1 discloses an FFV engine system which extracts a fuel having a high gasoline content from a main tank storing a fuel that contains gasoline and ethanol at any given blend ratio; transfers the extracted fuel to a sub-tank which provided separately from the main tank; and stores the fuel in the sub tank. The engine system disclosed in PATENT DOCUMENT 1 allows the sub-tank to store constantly a fuel with stabilized vaporizability. Hence, when the engine system disclosed in PATENT DOCUMENT 1 uses a fuel having a high ethanol content, the system blends, at an appropriate ratio, the fuel stored in the main tank with the fuel stored in the sub-tank and having a high gasoline content, under a running condition (e.g., when the engine system is run cold) causing a decrease in the ignitability and/or combustion stability of the air-fuel mixture. Thus, the engine system injects, into an intake port of the engine, a blended fuel having a higher gasoline content than the fuel stored in the main tank. Consequently, the engine system disclosed in PATENT DOCUMENT 1 uses the fuel having a high gasoline content and stored in the sub-tank to increase the vaporization rate of the fuel, under such a running condition as to cause a decrease in the vaporization rate. Thus, the engine system ensures the ignitability and/or the combustion stability of the air-fuel mixture when the engine system is run cold. That is to say, the engine system disclosed in PATENT DOCUMENT 1 changes the properties of the fuel into predetermined ones under a specific running state, in order to ensure the ignitability and/or combustion stability of the fuel.

On the other hand, PATENT DOCUMENT 2 discloses an FFV engine system without such a sub-tank. Instead, the engine system includes a fuel injection valve configured to directly inject a fuel into a cylinder. This PATENT DOCUMENT 2 discloses fuel injection control at the start of an engine. Specifically, the engine system of PATENT DOCUMENT 2 increases a fuel pressure and injects the high-pressure fuel into a cylinder during the compression stroke at a cold start of the engine when the temperature of the engine and the vaporizability of the fuel are low and when the fuel has a high ethanol content and the fuel injection amount is large, in view of the fact that a theoretical air fuel ratio of ethanol is smaller than that of gasoline and the fact that the fuel injection amount needs to be increased when using a fuel having a high ethanol content compared to when using a fuel having a high gasoline content. This promotes the vaporizability of the fuel and facilitates cold starting of the engine. Furthermore, even if the temperature of the engine is low, the engine system determines that the fuel be easily vaporizable when the ethanol content of the fuel is low, and injects the fuel into a cylinder during the intake stroke without increasing the fuel pressure in order to start the engine. Hence, the engine system disclosed in PATENT DOCUMENT 2 changes its fuel injection mode when the engine is started, depending on the ethanol content of the fuel.

CITATION LIST

Patent Document

PATENT DOCUMENT 1: Japanese Patent Application No. 2010-133288

PATENT DOCUMENT 2: Japanese Patent Application No. 2010-37968

SUMMARY OF THE INVENTION

Technical Problem

The configuration that needs a sub-tank as disclosed in PATENT DOCUMENT 1 has two fuel feeding systems, which complicates, and increases the cost of, the engine system. Hence, there is a demand for a configuration without a sub-tank as disclosed in PATENT DOCUMENT 2.

On the other hand, as to an FFV, the change in the ethanol content of the fuel to be fed changes the ethanol content of the fuel stored in its main tank, as described above. Hence, the ignitability and/or combustion stability of the air-fuel mixture need to be constantly ensured regardless of the properties of the fuel stored in the main tank. In this respect, the engine system disclosed in PATENT DOCUMENT 2 selects, at the start of the engine, an appropriate fuel injection mode for the properties of the fuel stored in the main tank.

During the operation of the engine after its start, the vaporization rate of the fuel changes along with, for example, a rise in the temperature of the engine. Hence, during the engine operation, the fuel injection modes could be switched depending on the vaporization rate of the fuel. However, the present inventors discovered that switching the fuel injection modes would cause a torque shock. Specifically, the vaporization rate of the fuel fed into a cylinder varies depending on whether the fuel injection mode is an intake stroke injection or a compression stroke injection. Hence, even if the same amount of fuel is injected before and after a switch of the fuel injection modes, the amount of the fuel actually vaporized varies. As a result, the air-fuel ratio of the air-fuel mixture changes before and after the switch of the fuel injection modes, which causes the torque shock.

In view of the forgoing background, it is therefore an object of the present disclosure to either avoid or reduce, to say the least, the risk of causing a torque shock to an engine to be fed with a fuel containing an unconventional fuel, of which the vaporization rate is lower than that of gasoline at or below a specific temperature, when the fuel feeding modes are switched depending on a running state of the engine body.

Solution to the Problem

The present inventors pay our attention to the fact that the amount of a fuel to be fed to the engine body is obtained by making an augmenting correction to a basic fuel feeding amount, which is to be set according to a running state of the engine body, using a correction factor that has been set in advance according to the vaporization rate of the fuel. Thus, in switching the fuel feeding modes, the value of the correction factor is changed according to the present invention in order to avoid, or reduce to say the least, a torque shock by preventing the fuel to be actually vaporized immediately after the switch from going too little or too much and by avoiding a change in the air-fuel ratio of an air-fuel mixture before and after the switch.

Specifically, a technique disclosed here relates to a control device for a spark-ignition engine. This control device for a spark-ignition engine comprises an engine body configured to run with a fuel including an unconventional fuel, of which the vaporization rate is lower, at or below a specific temperature, than that of the gasoline; a fuel feeder configured to feed the fuel into a cylinder provided for the engine body; and a controller configured to operate the engine body by controlling at least the fuel feeder.

If the engine body is under a load greater than a predetermined load, the controller is configured to: select a first fuel feeding mode in which a larger amount of the fuel is fed during a compression stroke than during an intake stroke if the engine body has a temperature which is equal to or below a predetermined temperature; and select a second fuel feeding mode in which a larger amount of the fuel is fed during the intake stroke than during the compression stroke if the engine body has a temperature which is higher than the predetermined temperature, Then, the amount of the fuel to be fed by the fuel feeder is obtained by making an augmenting correction to a basic fuel feeding amount to be set based on a running state of the engine body, using a correction factor which has been set in advance based on a vaporization rate of the fuel. Immediately after a switch from the first fuel feeding mode to the second fuel feeding mode as the temperature of the engine body rises so much as to exceed the predetermined temperature, the controller is configured to set the correction factor immediately after the switch to be greater than that before the switch.

Here, the "unconventional fuel, of which the vaporization rate is lower, at or below a specific temperature, than that of gasoline" may be a single component fuel, for example. Specifically, examples of such unconventional fuels include alcohols such as ethanol and methanol. A specific example of the alcohol may be a biogenic alcohol such as bioethanol made from sugar cane or corn.

Moreover, the "fuel including an unconventional fuel" includes both a fuel that is a blend of the unconventional fuel and gasoline and a fuel consisting essentially of the unconventional fuel alone. The blend ratio of the unconventional fuel and gasoline is not particularly limited, and any given blend ratio may be adopted. The fuel to be fed to the engine body may have a constant blend ratio of the unconventional fuel and gasoline. Alternatively, the blend ratio may be changed as needed. If the unconventional fuel is ethanol, the "fuel including an unconventional fuel" includes a fuel having any ethanol content. Specifically, the fuel may fall within the range of E25 in which 25% of ethanol is blended with gasoline to E100 consisting 100% of ethanol. However, this definition does not necessarily exclude a possibility that a fuel with no such unconventional fuel is fed to the engine body. When the unconventional fuel is ethanol, for example, the fuel to be fed to the engine body includes a fuel having any ethanol content. Specifically, the fuel may fall within the range of gasoline (i.e., E0 including no ethanol) to E85 in which 85% of ethanol is blended with gasoline. Furthermore, the "fuel including an unconventional fuel" may contain water. Hence, E100 containing approximately 5% of water is also one of the "fuels including an unconventional fuel". Note that the alcohol content of the fuel may be detected or estimated by any of various methods.

The "vaporization rate" may be defined herein as a ratio by weight of the fuel contributing to combustion to the fuel fed into the cylinder. This vaporization rate may be calculated based on a detection value of an $O_2$ sensor attached to an exhaust passageway of the engine. Under a condition that the temperature of the engine body is at or below a predetermined temperature, the vaporization rate may decrease as the content of the unconventional fuel in the fuel increases or as the temperature of the engine body falls.

The "fuel feeder" may include at least a fuel tank which stores a fuel including an unconventional fuel, a high-pressure pump which raises the pressure of the fuel, and a fuel injection valve which injects the fuel with a raised pressure. The high-pressure pump may be configured to be driven by the engine body or by a power source provided separately from the engine body. For example, the high-pressure pump may be an electric pump. Furthermore, the fuel injection valve may directly inject the fuel into a cylinder. In addition to a fuel injection valve of such a direct injection type, the engine body may further include a fuel injection valve injecting the fuel into the intake port.

The situation where "the engine body is under a load greater than a predetermined load" means that the load on the engine body is relatively heavy. The situation where "the engine body is under a load greater than a predetermined load" may also mean that the engine body is running in the heavy load range when the load range of the engine is evenly divided into two equal ranges (namely, a light load range and the heavy load range) or that the engine body is running in the medium and heavy load ranges when the load range of the engine is evenly divided into three equal ranges (namely, a light load range, a medium load range, and a heavy load range). The predetermined load may be, but does not have to be, approximately Ce=0.4.

The state where "the engine body is at or below a predetermined temperature" is that, at the temperature, the vaporization rate of the fuel containing the unconventional fuel decreases. For example, such a state is observed during a cold-running phase of the engine. If the unconventional fuel is ethanol (i.e., with a standard boiling point of 78° C.), the predetermined temperature may be, but does not have to be, approximately 20° C.

According to the configuration described above, if the engine body is under a load greater than the predetermined load, and is at or higher than the predetermined temperature—that is, if the engine body is under such a temperature condition that the vaporization rate of a fuel with a high unconventional fuel content decreases —, the controller switches the fuel feeding mode to the first fuel feeding mode in which a larger amount of the fuel is fed during the compression stroke than during the intake stroke. This includes reducing the amount of the fuel to be fed during the intake stroke to zero and feeding the fuel during the compression stroke alone.

During the compression stroke, the fuel is directly injected into the cylinder. This enables promoting the vaporization of the fuel by utilizing a rise in the temperature in the cylinder caused by adiabatic compression along with the progress of the compression stroke. In particular, when the engine body is under a load equal to or greater than the predetermined load, the manifold vacuum is relatively low. Hence, the fuel vaporization would not be promoted so much even by the use of the manifold vacuum. In the running state in which substantially no manifold vacuum can be utilized, feeding the fuel during the compression stroke enables promoting the vaporization of the fuel, and is very effective. Since the temperature of the engine is relatively low, the vaporization rate of the fuel falls, particularly when the fuel has a high unconventional fuel content. However, feeding the fuel during the compression stroke promotes the vaporization of the fuel. As a result, the ignitability and/or combustion stability of the air-fuel mixture are/is successfully ensured.

In contrast, if the temperature of the engine body is higher than the predetermined temperature—that is, if the engine body is under such a temperature condition that the evaporation rate rises even if the fuel has a high unconventional fuel content —, the controller switches the fuel feeding modes to the second fuel feeding mode in which a larger amount of the fuel is fed during the intake stroke than during the compression stroke. This includes reducing the amount of the fuel to be fed during the compression stroke to zero and feeding the fuel during the intake stroke alone.

Since the temperature of the engine body is relatively high, a relatively high vaporization rate is ensured, regardless of the properties of the fuel. Hence, even if the manifold vacuum cannot be utilized, the fuel vaporizes through feeding of the fuel during the intake stroke. To the contrary, feeding the fuel into the cylinder during the compression stroke is disadvantageous in the homogenization of the air-fuel mixture, because the intake flow in the cylinder is weak and the period of time between the start of the fuel feeding and the ignition becomes shorter. Feeding the fuel during the intake stroke is advantageous in homogenizing the air-fuel mixture, because this feeding utilizes a strong intake flow and a sufficiently long air-fuel mixture creating period. This improves the combustion stability of the air-fuel mixture.

Hence, the controller switches the modes between the first fuel feeding mode and the second fuel feeding mode depending on the temperature level of the engine body. For example, when the temperature of the engine body gradually rises after the cold start of the engine body, the fuel feeding mode switches from the first fuel feeding mode to the second fuel feeding mode. In other words, the fuel feeding modes are switched from a feeding mode in which a comparatively large amount of the fuel is fed during the compression stroke to a feeding mode in which a comparatively large amount of the fuel is fed during the intake stroke.

Here, the vaporization rate of the fuel gradually increases with a rise in the temperature of the engine body. Thus, a correction factor for making an augmenting correction to the basic amount of the fuel to be fed basically decreases as the temperature of the engine body rises.

However, the first fuel feeding mode, in which a comparatively large amount of the fuel is fed during the compression stroke, is designed to vaporize the fuel by mainly utilizing the temperature in the cylinder. On the other hand, the second fuel feeding mode, in which a comparatively large amount of the fuel is fed during the intake stroke hardly utilizes the temperature in the cylinder to vaporize the fuel. Hence, the first fuel feeding mode and the second fuel feeding mode are different in the vaporization rate of the fuel fed into the cylinder. Specifically, the first fuel feeding mode achieves a higher vaporization rate than the second fuel feeding mode does, and the second fuel feeding mode immediately after the switch achieves a lower vaporization rate than the first fuel feeding mode does.

Hence, according to the above configuration, the correction factor of the fuel feeding amount, which is basically decreased as the temperature of the engine body rises, is set to be a larger value immediately after the switch from the first fuel feeding mode to the second fuel feeding mode than the correction factor before the switch. This increases the fuel feeding amount in response to a fall in vaporization rate caused by the switch of fuel feeding modes, even if the load is substantially the same before and after the switch. That is to say, the fuel feeding amount gradually decreases as the temperature of the engine body rises, and steeply increases when the fuel feeding modes are switched. This avoids the shortage of vaporized fuel immediately after the switch to the second fuel feeding mode, thereby avoiding a change in the air-fuel ratio of the air-fuel mixture. As a result, the torque shock involved with the switch of the fuel feeding modes is either successfully avoided or reduced to say the least.

The controller may select the second fuel feeding mode if the load on the engine body is equal to or smaller than the predetermined load. When the switch is made from the first fuel feeding mode to the second fuel feeding mode as the load on the engine body decreases so much as to be equal to or below the predetermined load, the controller may change the correction factor into a greater value than that before the switch. When the switch is made from the second fuel feeding mode to the first fuel feeding mode as the load on the engine body increases so much as to exceed the predetermined load, the controller may change the correction factor into a smaller value than that before the switch.

When the engine body is under a load equal to or smaller than a predetermined load, the engine body is under a relatively light load. Thus, the throttle valve is decreased, and the manifold vacuum becomes higher. Consequently, the flash-boiling effect, utilizing the manifold vacuum, promotes the vaporization of the fuel. The controller then switches the fuel feeding modes to the second fuel feeding mode in which the fuel feeding amount during the intake stroke is made comparatively large. As a result, the vaporization of the fuel is promoted regardless of the properties of the fuel, and the resulting ignitability and/or combustion stability of the air-fuel mixture are/is ensured.

Thus, when the engine body is under a load equal to or smaller than the predetermined load, the second fuel feeding mode is selected. Consequently, as the load on the engine body decreases so much as to be equal to or below the predetermined load, the controller switches the fuel feeding modes from the first fuel feeding mode to the second fuel feeding mode, and as the load on the engine body increases so much as to exceed the predetermined load, the controller switches the fuel injection modes from the second fuel feeding mode to the first fuel feeding mode. Hence, the fuel feeding modes are also switched with a change in the load of the engine body. Thus, according to the configuration described above, when the switch is made from the first fuel feeding mode to the second fuel feeding mode, the correction factor is changed into a greater value than the value before the switch. The load of the engine body decreases, whereas the fuel feeding amount increases.

As a result, the fuel feeding amount increases in response to a fall in the vaporization rate caused by the switch to the second fuel feeding mode as described above. This avoids the shortage of vaporized fuel, thereby successfully avoiding or reducing a torque shock. Here, a change of the value of the correction factor into a greater one does not mean that the correction factor is changed continuously, but means that the correction factor is changed discontinuously.

Moreover, when the switch is made from the second fuel feeding mode to the first fuel feeding mode, the value of the correction factor is changed into a smaller value than that before the switch. As a result, contrary to the switch from the first fuel feeding mode to the second fuel feeding mode, the load on the engine body increases, whereas the fuel feeding amount decreases. This causes a decrease in the fuel feeding amount in response to a rise in the vaporization rate caused by the switch to the first fuel feeding mode. Consequently, a torque shock is either successfully avoided, or reduced to say the least, by preventing the amount of the fuel vaporized from being excessive.

Another control device for a spark-ignition engine disclosed here comprises: an engine body configured to run with a fuel including an unconventional fuel, of which the vaporization rate is lower, at or below a specific temperature, than that of the gasoline; a fuel feeder configured to feed the fuel into a cylinder provided for the engine body; and a controller configured to operate the engine body by controlling at least the fuel feeder.

If the engine body has a temperature which is equal to or below a predetermined temperature, the controller is configured to: select a first fuel feeding mode in which a larger amount of the fuel is fed during a compression stroke than during an intake stroke if the engine body is under a load greater than a predetermined load; and select a second fuel feeding mode in which a larger amount of the fuel is fed during the intake stroke than during the compression stroke if the load on the engine body is equal to or smaller than the predetermined load.

The amount of the fuel to be fed by the fuel feeder is obtained by making an augmenting correction to a basic fuel feeding amount to be set based on a running state of the engine body, using a correction factor which has been set in advance based on a vaporization rate of the fuel. When a switch is made from the first fuel feeding mode to the second fuel feeding mode as the load on the engine body decreases so much as to be equal to or below the predetermined load, the controller is configured to change the correction factor into a greater value than that before the switch. When the modes are switched from the second fuel feeding mode to the first fuel feeding mode as the load on the engine body increases so much as to exceed the predetermined load, the controller is configured to change the correction factor into a smaller value than that before the switch.

According to this configuration, when the fuel feeding modes are switched as the load on the engine body changes, the value of the correction factor for making an augmenting correction to the fuel feeding amount is not changed continuously but is changed discontinuously. This allows for either successfully avoiding, or reducing to say the least, a torque shock.

Advantages of the Invention

As can be seen from the foregoing description, when a switch is made from the first fuel feeding mode to the second fuel feeding mode as the temperature of the engine body rises, the control device for a spark-ignition engine described above increases the value of a correction factor for making an augmenting correction to the fuel feeding amount. Consequently, a torque shock is either successfully avoided or reduced to say the least. Moreover, when the fuel feeding modes are switched as the load on the engine body changes, the control device for a spark-ignition engine discontinuously changes the value of the correction factor for making an augmenting correction to the fuel feeding amount. Consequently, a torque shock is either successfully avoided or reduced to say the least.

DESCRIPTION OF EMBODIMENTS

Figure 1:
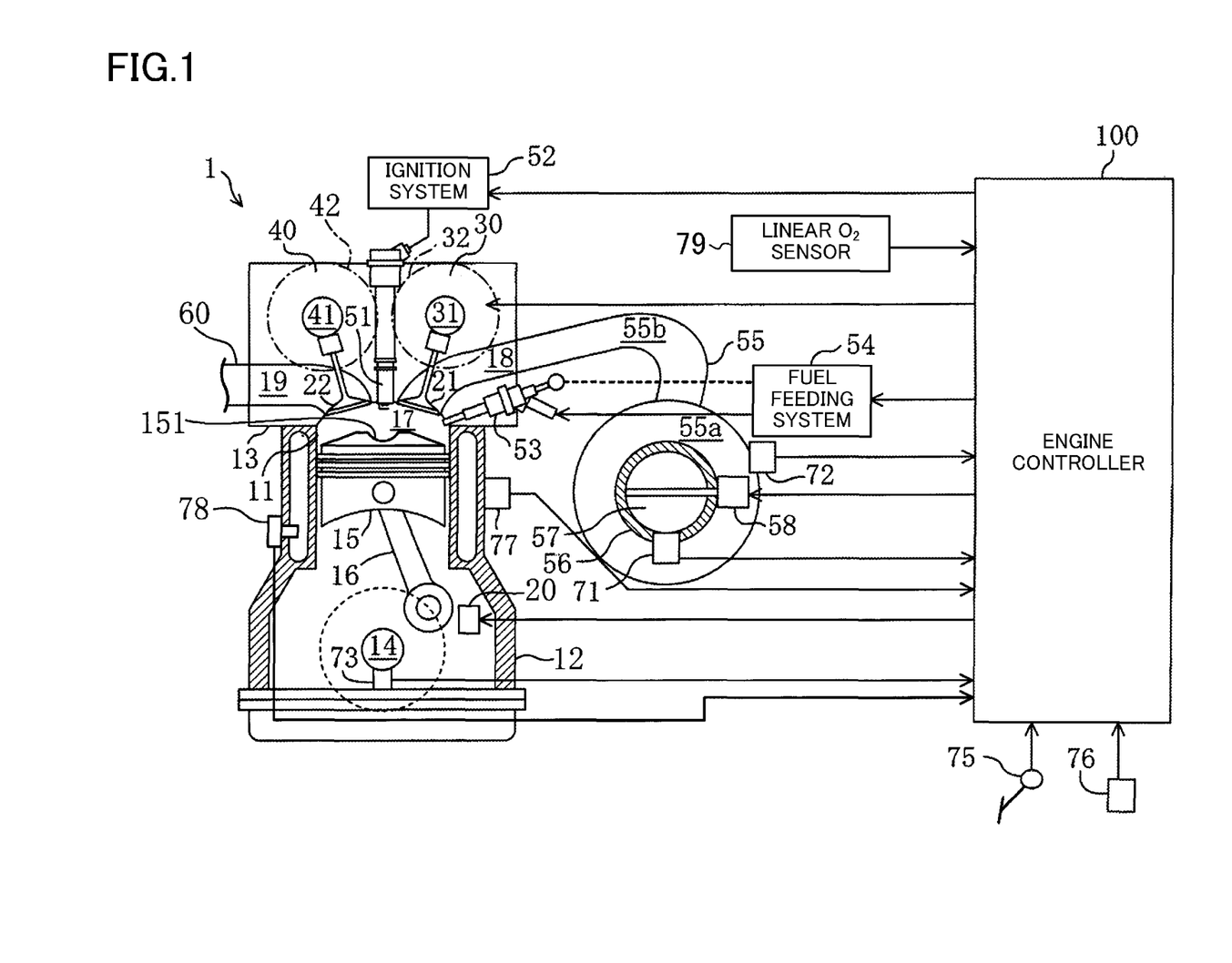
FIG. 1 generally illustrates a configuration of a spark-ignition engine and its control device.

Described below with reference to the drawings is an embodiment of a spark-ignition engine. Note that the preferred embodiments to be described below are only examples. As illustrated in FIG. 1, an engine system includes: an engine (i.e., an engine body) 1; various actuators attached to the engine 1; various sensors; and an engine controller 100 which controls the actuators in response to signals supplied from the sensors. The engine 1 of this engine system has a high compression ratio (e.g., a geometric compression ratio of 12 to 1 through 20 to 1 (e.g., 12 to 1)).

The engine 1 is a spark-ignition and four-stroke internal combustion engine, and includes four cylinders 11 (i.e., a first to fourth cylinders) which are arranged in line. FIG. 1 illustrates only one of the four cylinders. Note that an engine, to which the technique disclosed herein is applicable, shall not be limited to such a four-cylinder in-line engine. The engine 1 is mounted on a vehicle such as an automobile, and has an output shaft (not shown) connected through a transmission to drive wheels. The vehicle is propelled when the power generated by the engine 1 is transmitted to the drive wheels.

This engine 1 is fed with a fuel including ethanol (such as bioethanol). In particular, this vehicle is an FFV which can run with a fuel including any ethanol content falling within the range of 25% (i.e., E25 having a gasoline content of 75%) to 100% (i.e., E100 including no gasoline at all). E100 here may include water-containing ethanol with approximately 5% of water that has not been sufficiently removed through the distillation processes of ethanol which is still left there. Note that the technique disclosed herein shall not be limited to an FFV that is supposed to use E25 to E100. The same technique is also applicable to an FFV running with a fuel, of which the ethanol content falls within the range of, for example, E0 (i.e., consisting of gasoline alone and including no ethanol at all) to E85 (i.e., a blend of an 85% ethanol and 15% gasoline).

Although not shown, this vehicle includes a fuel tank that stores the fuel described above (i.e., a main tank) only. That is to say, a feature of this vehicle is that unlike a conventional FFV, this vehicle has no other sub-tanks to store, separately from the main tank, a fuel with a high gasoline content. This FFV is built based on a gasoline-powered vehicle which runs only with gasoline. The FFV and the gasoline-powered vehicle share most of their configuration.

The engine 1 includes a cylinder block 12 and a cylinder head 13 mounted on the cylinder block 12. The cylinder block 12 has the cylinder 11 inside. As in the known art, the cylinder block 12 has a crankshaft 14 rotatably supported by a journal, a bearing and other members. This crankshaft 14 is interlocked through a connecting rod 16 with a piston 15.

Each cylinder 11 has a ceiling portion with two ramps formed to extend from an approximately middle portion of the ceiling portion to the vicinity of the bottom end face of the cylinder head 13, and the ramps lean toward each other to form a roof-like structure. This shape is what is called a "pentroof".

Each piston 15 is slidably inserted into a corresponding cylinder 11, and defines a combustion chamber 17 along with the cylinder 11 and the cylinder head 13. The top face of the piston 15 is raised from its periphery portion toward its center portion to form a trapezoid corresponding to the pentroof shape on the ceiling face of the cylinder 11. This shape reduces the volume of the combustion chamber when the piston 15 arrives at the top dead center, and achieves as high a geometric compression ratio as 12 to 1 or more. The top face of the piston 15 has, approximately at its center, a cavity 151 which is an approximately spherical depression. The cavity 151 is positioned to face a spark plug 51 arranged in the center portion of the cylinder 11. This cavity 151 contributes to shortening one combustion period. In other words, as described above, this engine 1 having a high compression ratio has the piston 15, of which top face is raised. The engine 1 is configured so that, when the piston 15 arrives at the top dead center, the gap between the top face of the piston 15 and the ceiling face of the cylinder 11 becomes very narrow. If the cavity 151 were not formed, an initial flame would interfere with the top face of the piston 15, thus causing an increase in cooling loss, disturbing flame propagation, and resulting in a decrease in combustion speed. In contrast, this cavity 151 avoids interfering with the initial flame, and does not prevent the initial flame from growing. As a result, the flame propagation increases and the combustion period shortens. As to a fuel having a high gasoline content, such features are advantageous in reducing knocking, and contribute to an increase in torque due to advanced ignition timing.

An intake port 18 and an exhaust port 19 are provided on the cylinder head 13 of each cylinder 11, and each communicate with the combustion chamber 17. An intake valve 21 and an exhaust valve 22 are arranged to respectively shut off (i.e., close) the intake port 18 and the exhaust port 19 with respect to the combustion chamber 17. The intake valve 21 and the exhaust valve 22 are respectively driven by an intake valve driving mechanism 30 and an exhaust valve driving mechanism 40. The driven valves reciprocally move at predetermined timings to open and close the intake and exhaust ports 18 and 19.

The intake valve driving mechanism 30 and the exhaust valve driving mechanism 40 respectively include an intake camshaft 31 and an exhaust camshaft 41. The camshafts 31 and 41 are interlocked with the crankshaft 14 via a power transmission mechanism such as a known chain/sprocket mechanism. As known in the art, the power transmission mechanism rotates the camshafts 31 and 41 once while the crankshaft 14 rotates twice.

The intake valve driving mechanism 30 includes a variable intake valve timing mechanism 32 which can change the opening and closing timings of the intake valve 21. The exhaust valve driving mechanism 40 includes a variable exhaust valve timing mechanism 42 which can change the opening and closing timings of the exhaust valve 22. In this embodiment, the variable intake valve timing mechanism 32 includes a hydraulic, mechanical, or electric variable valve timing (VVT) mechanism which enables continuously changing the phase of the intake camshaft 31 within a predetermined range of angles. The variable exhaust valve timing mechanism 42 includes a hydraulic, mechanical, or electric VVT mechanism which enables continuously changing the phase of the exhaust camshaft 41 within a predetermined range of angles. The variable intake valve timing mechanism 32 changes the closing timing of the intake valve 21 to adjust an effective compression ratio. Note that the effective compression ratio refers herein to the ratio of the combustion chamber volume when the intake valve is closed to the combustion chamber volume when the piston 15 is at the top dead center.

The spark plug 51 is attached to the cylinder head 13 with screwing or any other known fixing structure. The spark plug 51 has an electrode aligned with approximate the center of the cylinder 11 and facing the ceiling portion of the combustion chamber 17. In response to a control signal from the engine controller 100, an ignition system 52 supplies an electric current to the spark plug 51 so that the spark plug 51 produces a spark at any desired ignition timing.

Using a bracket or any other known fixing member, a fuel injection valve 53 is attached to one side (i.e., to the intake side in FIG. 1) of the cylinder head 13 in this embodiment. This engine 1 directly injects fuel into the cylinder 11. In other words, the engine 1 is a so-called "direct-injection engine". The fuel injection valve 53 has a tip positioned below the intake port 18 in the vertical direction, and at the center of the cylinder 11 in the horizontal direction. The tip protrudes into the combustion chamber 17. Note that the arrangement of the fuel injection valve 53 shall not be limited to this. In this example, the fuel injection valve 53 is a multi-hole injector (i.e., MHI) having six holes. Regarding the orientation of each hole (not shown), the tip of the injector hole expands toward its end so that the fuel is injected throughout the space inside the cylinder 11. The MHI is beneficial in that (i) the injector has multiple holes and each hole has a small diameter, which enables injecting the fuel with a relatively high pressure, and (ii) the injector injects the fuel throughout the space inside the cylinder 11, which enables mixing the fuel better and enhancing the vaporization and atomization of the fuel. Hence, injecting the fuel during the intake stroke is beneficial in terms of mixing the fuel and promoting the vaporization and atomization of the fuel by taking advantage of an intake flow in the cylinder 11. On the other hand, injecting the fuel during the compression stroke is beneficial in terms of cooling the gas in the cylinder 11, because the vaporization and atomization of the fuel are promoted. Note that the fuel injection valve 53 does not have to be the MHI.

A fuel feeding system 54 includes a high-pressure pump which raises the pressure of the fuel and supplies the high-pressure fuel to the fuel injection valve 53, members such as a pipe and a hose which send the fuel from a fuel tank to the high-pressure pump, and an electric circuit which drives the fuel injection valve 53. Note that the illustration of their configuration is omitted herein. In this example, the high-pressure pump is driven by the engine 1. Optionally, the high-pressure pump may be an electric pump. The high-pressure pump has a relatively small capacity, as in a gasoline-powered vehicle. If the fuel injection valve 53 is an MHI, the fuel injection pressure is set to be relatively high since the fuel is injected through small holes. The electric circuit activates the fuel injection valve 53 in response to a control signal from the engine controller 100, and makes the fuel injection valve 53 inject a desired amount of the fuel into the combustion chamber 17 at a predetermined timing Here, the fuel feeding system 54 raises the fuel pressure as the number of revolutions of the engine revolution increases. Raising the fuel pressure increases the amount of fuel to be injected into the cylinder 11 with an increase in the number of revolutions of the engine. However, the high fuel pressure is advantageous in terms of the vaporization and atomization of the fuel. Besides, in the high fuel pressure also narrows the pulse width as much as possible for the fuel injection of the fuel injection valve 53. The highest fuel pressure may be 20 MPa, for example. As described above, the fuel tank stores an alcohol-containing fuel with any arbitrary ethanol content falling within the range of E25 to E100.

The intake port 18 communicates with a surge tank 55a via an intake passageway 55b in an intake manifold 55. The airflow from an air cleaner (not shown) is supplied to the surge tank 55a via a throttle body 56. The throttle body 56 is provided with a throttle valve 57. As known in the art, this throttle valve 57 reduces the airflow running into the surge tank 55a, and controls its flow rate. In response to a control signal supplied from the engine controller 100, a throttle actuator 58 adjusts the opening of the throttle valve 57.

As known in the art, the exhaust port 19 communicates with a passage in an exhaust pipe via an exhaust passageway in an exhaust manifold 60. This exhaust manifold 60 includes first collectors and a second collector (not shown). Each of the first collectors collects individual branch exhaust passageways connected to the respective exhaust ports 19 of the cylinders 11, so that the collected individual exhaust passageways are not neighboring one another in exhausting order. The second collector collects intermediate exhaust passageways provided downstream of the first collectors. That is to say, the exhaust manifold 60 of this engine 1 adopts a so-called "4-2-1 pipe layout".

The engine 1 further includes a starter motor 20 for cranking the engine 1 at its start.

The engine controller 100 is a controller based on a known microcomputer. The engine controller 100 includes a central processing unit (CPU) which executes a program, a memory, such as a random access memory (RAM) or a read-only memory (ROM), which stores a program and data, and an input-output (I/O) bus through which an electric signal is input and output.

The engine controller 100 receives various inputs including: the flow rate and temperature of an intake airflow from an airflow sensor 71; an intake manifold pressure from an intake pressure sensor 72; a crank angle pulse signal from a crank angle sensor 73; an engine coolant temperature from a coolant temperature sensor 78; and an oxygen concentration in the exhaust gas from a linear $O_2$ sensor 79 attached to an exhaust passageway. The engine controller 100 calculates the number of revolutions of the engine based on, for example, a crank angle pulse signal. Moreover, the engine controller 100 receives an accelerator position signal from an accelerator position sensor 75 which detects an accelerator pedal travel. Furthermore, the engine controller 100 receives a vehicle speed signal from a vehicle speed sensor 76 which detects a rotation speed of the output shaft of the transmission. In addition, the cylinder block 12 is further provided with a knocking sensor 77 including an acceleration sensor transforming vibrations of the cylinder block 12 into a voltage signal, and outputs the voltage signal to the engine controller 100.

Based on these inputs, the engine controller 100 calculates the following control parameters for the engine 1. Examples of the control parameters include a desired throttle opening signal, fuel injection pulse, ignition signal, and phase angle signal of a valve. The engine controller 100 then outputs those signals to the throttle actuator 58, the fuel feeding system 54, the ignition system 52, the variable intake valve timing mechanism 32, the variable exhaust valve timing mechanism 42 and other members. At the start of the engine 1, the engine controller 100 further outputs a drive signal to the starter motor 20.

Here, as a configuration unique to an FFV engine system, the engine controller 100 estimates the ethanol content of the fuel to be injected by the fuel injection valve 53, based on the result of detection by the linear $O_2$ sensor 79. The theoretical air fuel ratio of ethanol (9.0) is smaller than that of gasoline (14.7). The higher the ethanol content of the fuel is, the richer the theoretical air fuel ratio is (i.e., the lower the theoretical air fuel ratio is). If unburned oxygen is left in the exhaust gas under the condition that the engine is run at the theoretical air fuel ratio, a determination may be made that the ethanol content of the fuel is higher than expected. Specifically, refueling the vehicle could change the ethanol content of the fuel that the fuel injection valve 53 injects (i.e., the ethanol content of the fuel stored in the fuel tank). Thus, the engine controller 100 first determines, based on a detection value obtained by a level gauge sensor of the fuel tank, whether the vehicle has been refueled. If the answer is YES, the engine controller 100 estimates the ethanol content of the fuel. Based on the output signal of the linear $O_2$ sensor 79, the engine controller 100 estimates an ethanol content in the fuel. Specifically, if the air fuel ratio is lean, the engine controller 100 determines that the fuel contains more gasoline. On the other hand, if the air fuel ratio is rich, the engine controller 100 determines that the fuel contain more ethanol. Note that a sensor may be provided to detect the ethanol content of the fuel, instead of estimating the ethanol content of the fuel. The ethanol content thus estimated is used for controlling fuel injection.

The engine controller 100 further calculates the vaporization rate of the fuel fed into the cylinder 11, based on the result of detection by the linear $O_2$ sensor 79. The vaporization rate is defined as the ratio by weight of the fuel contributing to combustion to the fuel fed into the cylinder 11 (i.e., the amount of the fuel injected by the fuel injection valve 53). The engine controller 100 calculates the weight of the fuel contributing to the combustion based on the detection value obtained by the linear $O_2$ sensor 79, and calculates the vaporization rate based on the calculated fuel weight and the amount of the fuel injected by the fuel injection valve 53.

[Controlling Fuel Injection]

As described above, this engine system is mounted on an FFV. The engine 1 is fed with an alcohol-containing fuel, with any arbitrary ethanol content falling within the range of E25 to E100. FIG. 2 shows, in comparison, the respective vaporizabilities of gasoline and ethanol. Note that FIG. 2 shows how the distillation ratios (%) of gasoline and ethanol each change as the temperature varies under the atmospheric pressure. Gasoline is a multicomponent fuel, and evaporates in accordance with the boiling point of each component. The distillation ratio of gasoline changes approximately linearly with the temperature. Thus, some components of gasoline may vaporize to create combustible air-fuel mixture, even if the temperature of the engine 1 is relatively low.

In contrast, ethanol is a single component fuel, and its distillation ratio becomes 0% at or below a specific temperature (i.e., 78° C. that is the boiling point of ethanol). On the other hand, its distillation ratio reaches 100% once the specific temperature is exceeded. Hence, the comparison between gasoline and ethanol shows that ethanol has a lower distillation ratio than gasoline at or below the specific temperature. However, ethanol tends to have a higher distillation ratio than gasoline, once the specific temperature is exceeded. Thus, when the engine 1 is in the cold-running phase, i.e., when the temperature of the engine 1 is at or below a predetermined temperature (e.g., when the coolant temperature is less than approximately 20° C.), a fuel containing ethanol has a lower vaporization rate than gasoline. Consequently, when the engine 1 is in the cold-running phase, the vaporization rate of the fuel decreases as the temperature of the engine 1 falls and as the ethanol content of the fuel increases.

As can be seen, the vaporization rate of the fuel changes depending on the temperature of the engine 1 and the ethanol content of the fuel. Thus, in order to achieve a target amount of vaporized fuel, the engine controller 100 makes, in accordance with the vaporization of the fuel, augmenting correction to a basic fuel amount to be set based on, for example, an engine load and an alcohol content. Specifically, the fuel injection amount is set by multiplying the basic fuel amount by the fuel augmentation rate, as calculated with the expressions below. An actual vaporized fuel amount is obtained by multiplying the fuel injection amount by a vaporization rate.

[Fuel Injection Amount]=[Basic Fuel Amount]×(1+Fuel Augmentation Rate)

[Actual Vaporized Fuel Amount]=[Fuel Injection Amount]×[Vaporization Rate].

Figure 6:
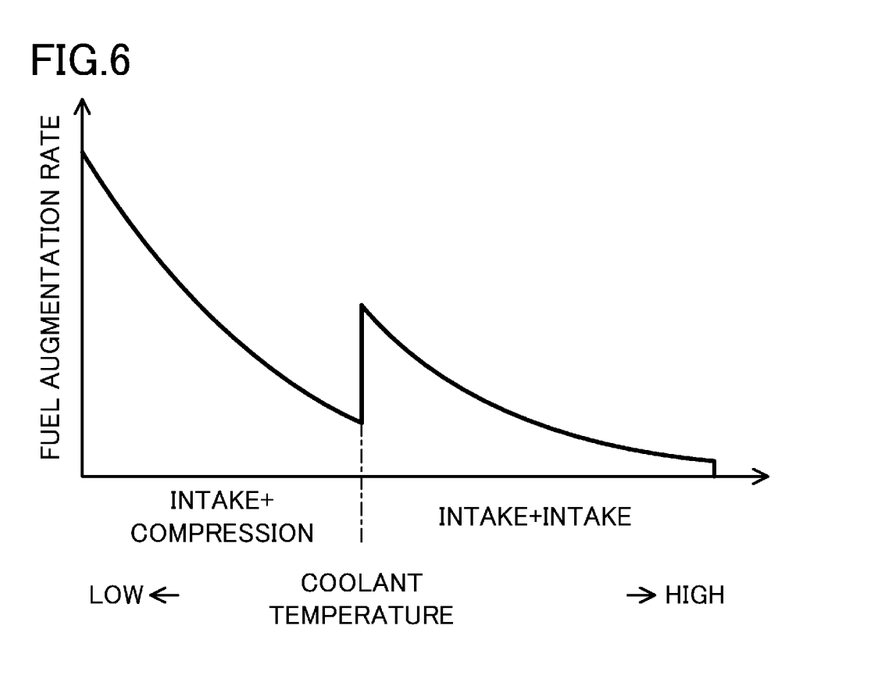
FIG. 6 shows how a fuel augmentation rate changes as the fuel injection modes are switched according to a rise in engine coolant temperature.

The fuel augmentation rate is preset based on a vaporization rate of each of running states of the engine, and stored in the engine controller 100. Here, the vaporization rate is obtained through, for example, experiments. Basically, the fuel augmentation rate increases as the vaporization rate falls, and decreases as the vaporization rate rises. Hence, as illustrated in FIG. 6, the fuel augmentation rate increases when the engine coolant temperature is low, and decreases when the engine coolant temperature is high. Note that the fuel augmentation rate shown in FIG. 6 or FIG. 7 will be detailed later.

Moreover, as will be described later, the vaporization rate changes, depending also on the timing of the fuel injection (i.e., whether it is injected during the intake stroke or the compression stroke). The fuel augmentation rate also changes accordingly with the vaporization rate.

Thus, the amount of the fuel to be injected by the fuel injection valve 53 increases as the vaporization rate of the fuel decreases. Hence, when the engine 1 is in the cold-running phase under a heavy load, more fuel is consumed due to the heavy load, and the magnitude of the augmenting correction to be made increases since the vaporization rate of the fuel is low. As a result, an extremely large amount of the fuel may be injected by the fuel injection valve 53. Moreover, since ethanol has a smaller theoretical air fuel ratio than gasoline, the amount of the fuel to be injected increases as the ethanol content in the fuel rises.

Figure 3:
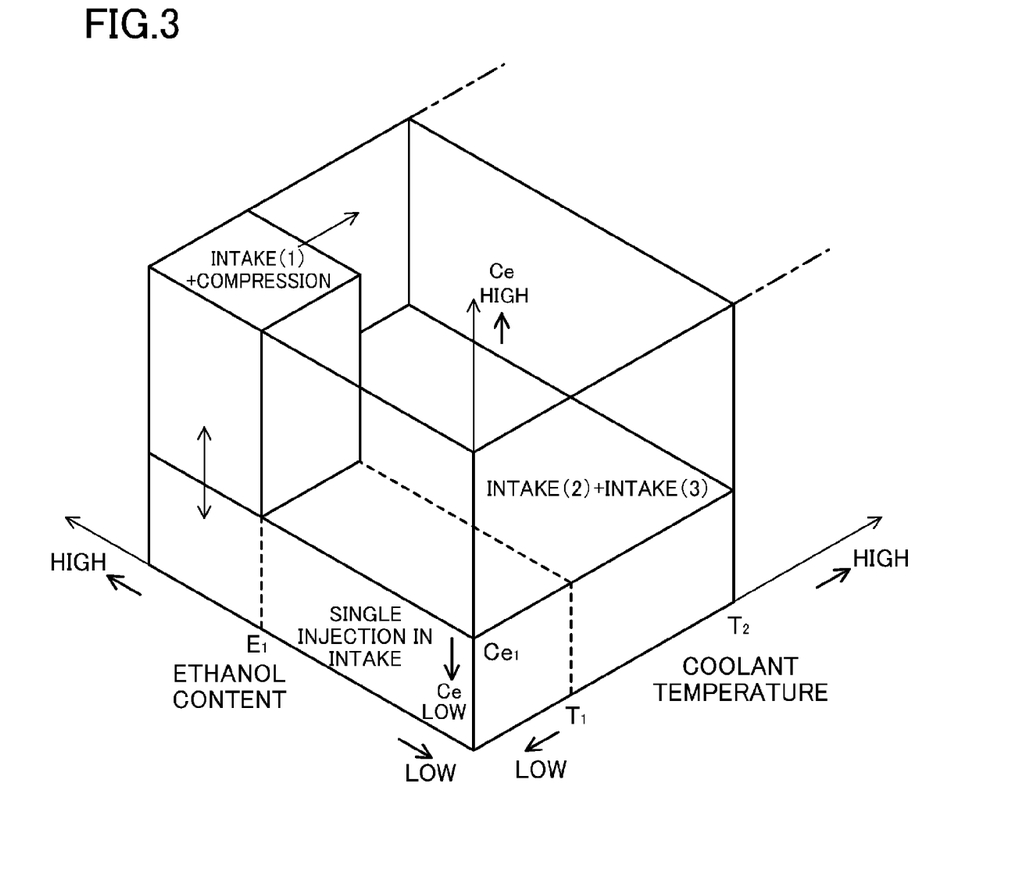
FIG. 3 is a map illustrating how to switch fuel injection modes, using an engine coolant temperature, an alcohol content, and a charging efficiency as parameters.

FIG. 3 conceptually illustrates an exemplary map of fuel injection modes, using an alcohol content of the fuel, an engine coolant temperature, and a charging efficiency as parameters. The map in FIG. 3 shows a range in which the engine coolant temperature is at or below a predetermined temperature $T_2$. This temperature range is equivalent to a period between the cold-running phase and the warm-up phase of the engine 1.

This engine system switches among three fuel injection modes, depending on the respective levels of the ethanol content in the fuel, an engine coolant temperature, and a charging efficiency. The fuel injection modes include: a first fuel injection mode in which the fuel is injected in each of the intake and compression strokes; a second fuel injection mode in which split injections of the fuel are performed during the intake stroke; and a third fuel injection mode in which a single injection of the fuel is performed during the intake stroke.

Specifically, the first fuel injection mode is an injection mode in which the ethanol content of the fuel is higher than a predetermined content $E_1$, the engine coolant temperature is at a predetermined value $T_1$ or less, and the charging efficiency Ce is at or above a predetermined value $Ce_1$. The predetermined value $T_1$ is approximately 20° C., for example. A case where the engine coolant temperature is equal to or lower than the predetermined value $T_1$ is equivalent to a case where the engine 1 is at a temperature in the cold-running phase. Furthermore, the predetermined content $E_1$ is 60% (i.e., E60 or higher), for example. In other words, this is equivalent to a case where the vaporization rate of the fuel is low since the engine coolant temperature is relatively low and the ethanol content is relatively high.

Moreover, the predetermined value $Ce_1$ is approximately 0.4, for example. Here, the engine 1 is under a relatively heavy load, and the resulting fuel injection amount is relatively large. In addition, the high ethanol content is combined with a high fuel augmentation rate caused by the low fuel vaporization rate. As a result, the fuel injection amount becomes very large. In the first fuel injection mode, such a large amount of fuel is injected into the cylinder 11 during each of the intake and compression strokes.

Figure 4:
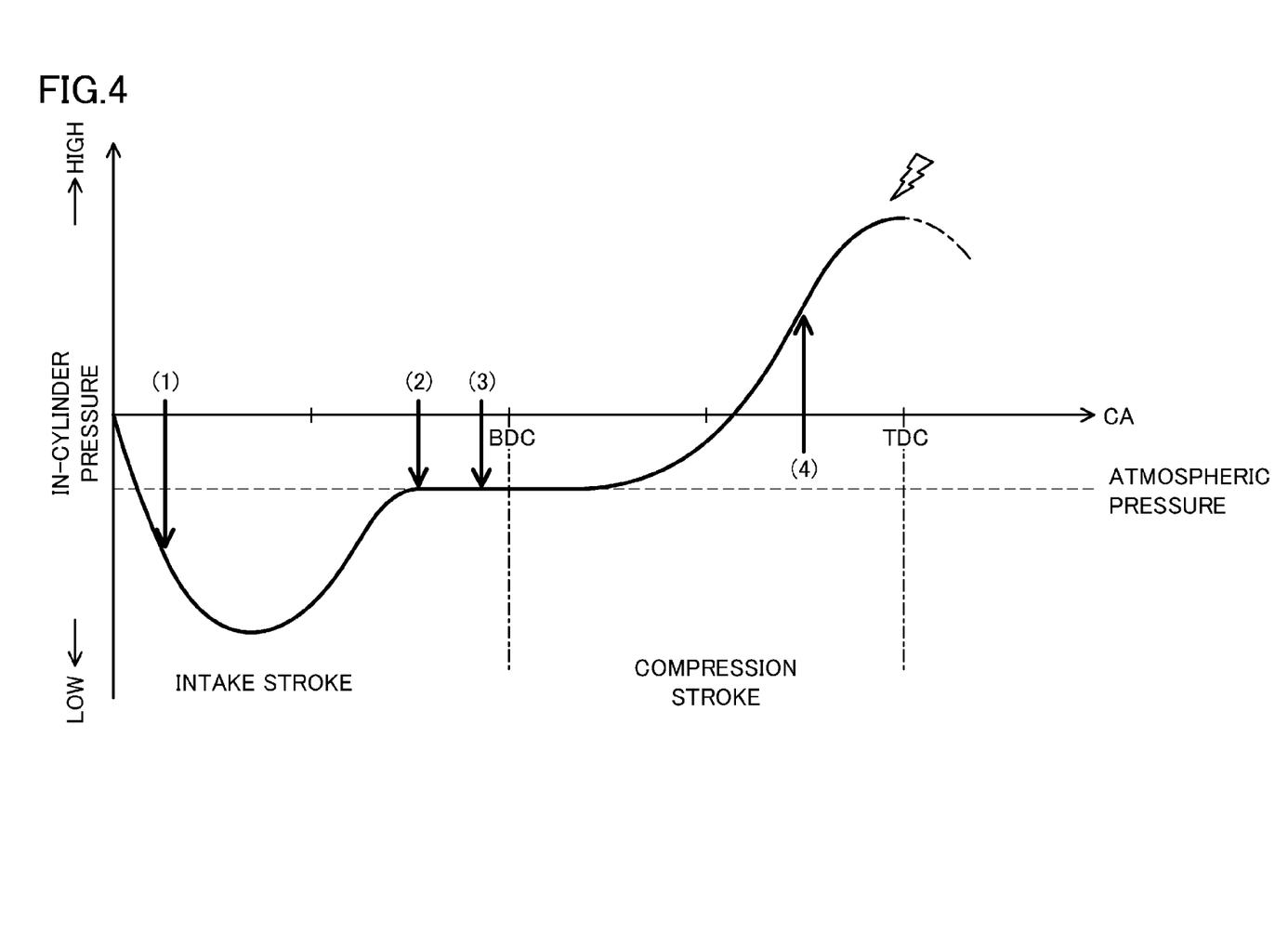
FIG. 4 shows an exemplary change in pressure in a cylinder and a timing of fuel injection.

FIG. 4 shows an exemplary change in pressure in the cylinder 11 and a timing of fuel injection. As indicated by the arrow (1) in FIG. 4, the injection in the first fuel injection mode during the intake stroke may start, for example, at a point of time immediately after the intake valve 21 has opened and when the pressure in the cylinder 11 falls steeply. Taking advantage of this manifold vacuum, the first fuel injection mode promotes the vaporization of the fuel by the flash-boiling effect. Moreover, the intake stroke injection enables homogenizing the air-fuel mixture and ensuring a sufficiently long air-fuel mixture creating period.

Furthermore, as indicated by the arrow (4) in FIG. 4, the injection in the first fuel injection mode during the compression stroke may start, for example, during the second half of the compression stroke (i.e., the second half of the compression stroke when the compression stroke is virtually divided into the first and second halves). This is to promote the vaporization of the fuel by utilizing a rise in temperature in the cylinder 11 caused by the adiabatic compression during the compression stroke. As described above, this engine 1 has a high compression end temperature due to the high geometric compression ratio, and thus the compression stroke injection is very advantageous in vaporizing the fuel. During the compression stroke injection, the injection of the fuel into the cylinder 11 may be delayed until the temperature and pressure within the cylinder 11 reach such levels at which the ethanol is ready to evaporate. This allows the ethanol to vaporize immediately after having been injected into the cylinder 11. It is recommended that a sufficiently long period be provided for creating an air-fuel mixture between the end point of the fuel injection and the timing of ignition. Thus, the fuel injection may be started during the first half of the compression stroke if the fuel injection amount is so large as to take a long fuel injection period.

The second fuel injection mode is an injection mode used in a range (i) in which the charging efficiency Ce is at or above the predetermined value $Ce_1$ and the engine coolant temperature is at or below the predetermined value $T_2$, and (ii) other than the range in which the first fuel injection mode is executed. In other words, the second fuel injection mode may be regarded as a fuel injection mode used in a range in which the engine load is relatively heavy and the fuel vaporization rate is not so low. In the second fuel injection mode, even though the fuel injection amount is relatively large since the engine 1 is under a relatively heavy load, the fuel augmentation rate does not rise very high since the fuel vaporization rate is not so low. Consequently, the fuel injection amount is reduced. In the second fuel injection mode, the split injections are executed during the intake stroke.

The injection in the second fuel injection mode during the intake stroke is executed at the timings indicated by the arrows (2) and (3) in FIG. 4. These timings are later than the injection timing (1) in the first fuel injection mode during the intake stroke. As described above, the second fuel injection mode is for injecting the fuel under a condition in which the vaporization rate is not so low. Hence, the manifold vacuum does not have to be utilized for promoting the vaporization of the fuel. To the contrary, the piston 15 is located in the vicinity of the upper end in the cylinder 11 immediately after the intake valve 21 has opened. Thus, the fuel injected from the fuel injection valve 53 will collide against the top face of this piston 15. This can be disadvantageous in homogenizing the air-fuel mixture. Hence, in the second fuel injection mode, the fuel is injected into the cylinder 11 at a time point when the piston 15 moves into the lower portion of the cylinder 11 during the second half of the intake stroke. This reduces the risk of the fuel colliding against the piston 15. On the other hand, the fuel injection at this time point is beneficial in homogenizing the air-fuel mixture by utilizing a strong intake flow.

In a range where the engine coolant temperature is at or below $T_1$ and the charging efficiency Ce is at or above the predetermined value $Ce_1$, the second fuel injection mode and the first fuel injection mode switch one to the other depending on the ethanol content of the fuel. Specifically, the second fuel injection mode is executed when the ethanol content of the fuel is low (i.e., when the gasoline content is high), and the first fuel injection mode is executed when the ethanol content of the fuel is high. Ethanol has a property which does not allow so much smoke to be generated as gasoline does, since the combustion temperature of the ethanol is relatively low and the molecules of the ethanol include oxygen. Because of this property, smoke is hardly generated when the ethanol content is high, even if the fuel is injected during the compression stroke as in the first fuel injection mode. Thus, when the ethanol content is relatively high, it is beneficial to execute the compression stroke injection to promote the vaporization of the fuel.

To the contrary, it will affect the homogeneity of the air-fuel mixture disadvantageously to inject the fuel into the cylinder during the compression stroke. Hence, if the compression stroke injection is executed when the gasoline content of the fuel is high, there could be a risk of generating smoke. Hence, when the ethanol content is relatively low, the intake stroke injection alone is executed, without executing the compression stroke injection, so that the generation of smoke may be avoided.

The third fuel injection mode is an injection mode in which the charging efficiency Ce is below the predetermined value $Ce_1$. Since the charging efficiency is relatively low, the opening of the throttle valve 57 is decreased, so that relatively high manifold vacuum is obtained. Hence, the vaporization of the fuel is successfully promoted by taking advantage of the obtained manifold vacuum thanks to the flash-boiling effect, regardless of the respective levels of the engine coolant temperature and the ethanol content (i.e., regardless of the level of the vaporization rate). In the third fuel injection mode, a single injection is executed during the intake stroke. In order to use the manifold vacuum effectively, the starting point of the fuel injection may be set during the first half of the intake stroke.

In this manner, regardless of the properties of the fuel to be fed to the engine 1, not only the ignitability and/or combustion stability of the air-fuel mixture but also the exhaust emission performance are successfully ensured.

Figure 5:
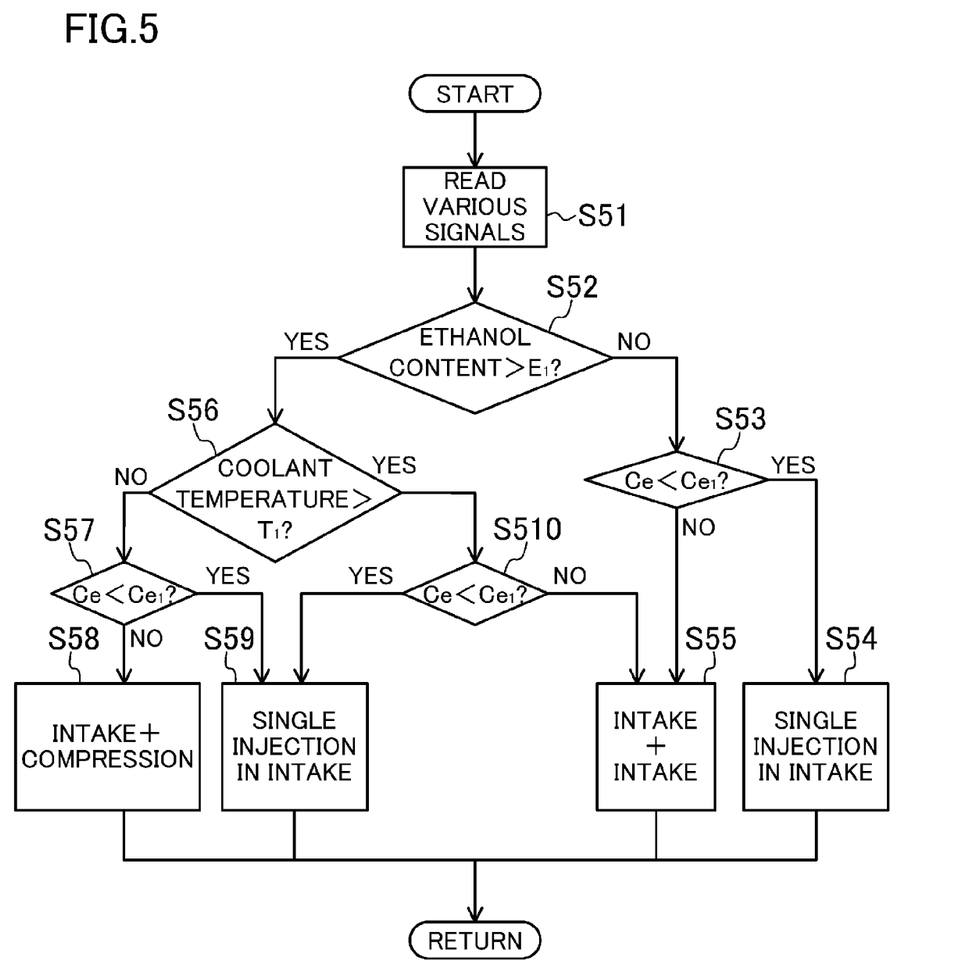
FIG. 5 is a flowchart showing how to set a fuel injection mode.

FIG. 5 is a flowchart showing how to set a fuel injection mode. The process in the flowchart is executed by the engine controller 100. The engine controller 100 reads various signals in Step S51 after the start. In the next Step S52, determination is made whether an estimated ethanol content exceeds a predetermined value $E_1$. If the estimated ethanol content is equal to or below the predetermined value $E_1$ (i.e., if the answer is NO), the process proceeds to Step S53. On the other hand, if the estimated ethanol content exceeds the predetermined value $E_1$ (i.e., if the answer is YES), the process proceeds to Step S56.

In Step S53, a determination is made whether the charging efficiency is below the predetermined value $Ce_1$. If the charging efficiency is below the predetermined value $Ce_1$ (i.e., if the answer is YES), the process proceeds to Step S54, and the fuel injection mode is set to be the third fuel injection mode, that is, a single injection during the intake stroke. On the other hand, if the charging efficiency is equal to or above the predetermined value $Ce_1$ (i.e., if the answer is NO), the process proceeds to Step S55, and the fuel injection mode is set to be the second fuel injection mode, that is, split injections during the intake stroke.

Meanwhile, in Step S56 to which the process proceeds when the ethanol content is determined to be above the predetermined value, a determination is made whether the engine coolant temperature exceeds the predetermined value $T_1$. If the engine coolant temperature exceeds the predetermined value $T_1$ (i.e., if the answer is YES), the process proceeds to Step S510. In Step S510, a determination is made whether the charging efficiency is below the predetermined value $Ce_1$. If the answer is YES, the process proceeds to Step S59, and the fuel injection mode is set to be the third fuel injection mode (i.e., a single injection during the intake stroke). On the other hand, if the answer is NO, the process proceeds to Step S55 and the fuel injection mode is set to be the second fuel injection mode (i.e., split injections during the intake stroke).

If the engine coolant temperature turns out to be at or below the predetermined value $T_1$ in Step S56 (i.e., if the answer is NO), the process proceeds to Step S57. In this Step 57 too, a determination is made again whether the charging efficiency is below the predetermined value $Ce_1$. If the answer is YES in Step S57, the process proceeds to Step S59, and the fuel injection mode is set to be the third fuel injection mode (i.e., a single injection during the intake stroke). On the other hand, if the answer is NO, the flow proceeds to Step S58, and the fuel injection mode is set to be the first fuel injection mode (i.e., split injections during the intake and compression strokes).

Thus, the fuel injection modes are switched from one to the other depending on the level of the engine coolant temperature. Thus, the fuel injection modes switch as the temperature of the engine coolant changes, more specifically, as the coolant temperature gradually rises after a cold start of the engine 1. In particular, as indicated by the arrow in FIG. 3, modes are switched from the first fuel injection mode (i.e., a split injections during the intake and compression strokes) to the second fuel injection mode (i.e., split injections during the intake stroke), if the engine coolant temperature rises when the ethanol content exceeds the predetermined value $E_1$ and when the charging efficiency Ce exceeds the predetermined value $Ce_1$. Once this switch has been made, the compression stroke injection, which has been performed before the switch, is no longer performed. As described above, the compression stroke injection promotes the vaporization of the fuel by utilizing the temperature in the cylinder. Enabling or disabling the compression stroke injection will make a big difference in the vaporization rate of the fuel injected into the cylinder 11. Specifically, when the engine coolant temperature rises, the vaporization rate decreases steeply at the stop of the compression stroke. Due to this steep decrease in the vaporization rate, an actual vaporized fuel amount becomes insufficient immediately after the switch to the second fuel injection mode because of the difference in vaporization rate even if the same amount of the fuel is injected before and after the switch. As a result, the air fuel ratio turns lean with respect to a theoretical air fuel ratio. In such a state, a torque to be generated will decrease, causing a torque shock at the time of switching the fuel injection modes.

Here, in engine control, such a torque shock involved with switching the modes of controls is reduced through an adjustment of ignition timing, for example. As described above, however, this torque shock is originally due to an insufficient amount of the vaporized fuel, and controlling the ignition timing, for example, cannot reverse the torque decrease.

Figure 7:
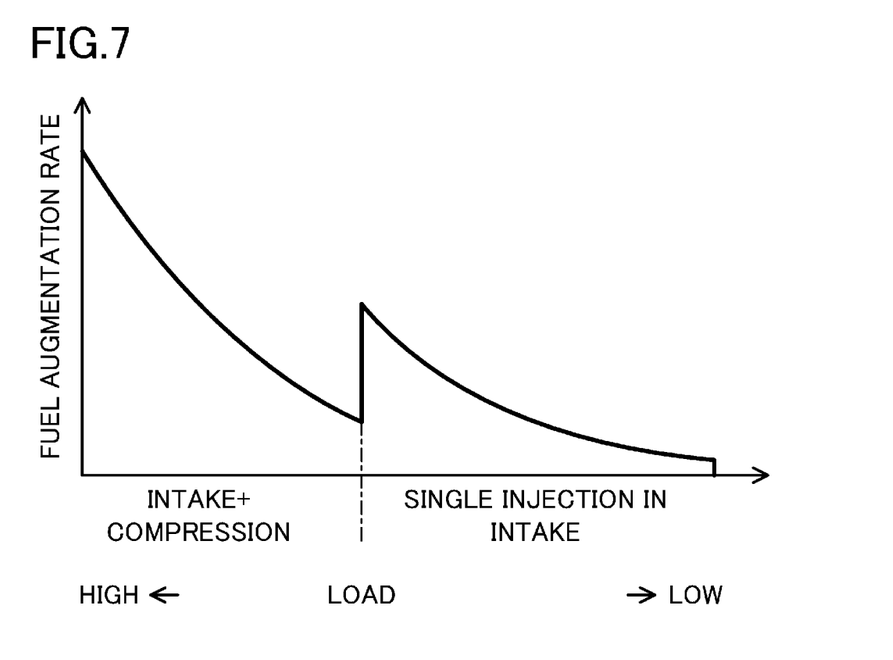
FIG. 7 shows how a fuel augmentation rate changes as the fuel injection modes are switched according to the load level of the engine.

Thus, as illustrated in FIGS. 6 and 7, this engine system discontinuously changes the fuel augmentation rate before and after the switch of fuel injection modes. Specifically, the ordinate of FIG. 6 represents the engine coolant temperature. The engine coolant temperature decreases comparatively toward the left of the paper, and increases comparatively toward the right of the paper. Hence, the engine coolant temperature changes from the left to the right of the paper after the cold start of the engine 1. The engine 1 is under a running state in which the ethanol content of the fuel is higher than the predetermined value $E_1$, and the charging efficiency Ce is higher than the predetermined value $Ce_1$. Thus, on the left-hand side of FIG. 6, split injections are executed during the intake and compression strokes (i.e., the first fuel injection mode). On the right-hand side of FIG. 6, split injections are executed during the intake stroke (i.e., the second fuel injection mode).

First, under a condition in which the first fuel injection mode is executed, the vaporization rate rises as the engine coolant temperature rises. Thus, the fuel augmentation rates are set to be gradually decreasing values. At the time of switching the fuel injection modes, as described above, the fuel augmentation rate, which has been decreasing until then, increases steeply in response to the steep decrease in vaporization rate. Hence, the fuel injection amount significantly increases immediately after the modes have been switched from the first fuel injection mode to the second fuel injection mode. Thus, even if the vaporization rate decreases without executing the compression stroke injection, a required amount of vaporized fuel is still ensured successfully. Consequently, the shortage of the vaporized fuel immediately after the switch, and eventually the torque shock, are avoidable. After that, also under a condition in which the second fuel injection mode is executed, the vaporization rate rises as the engine coolant temperature rises. As a result, the fuel augmentation rates are set to be gradually decreasing values.

Here, as can be seen clearly from the map in FIG. 3, the fuel injection modes are switched not only when the engine coolant temperature rises. Specifically, if the load on the engine 1 decreases from a heavy load to a light load when the ethanol content exceeds the predetermined value $E_1$ and the engine coolant temperature is at or below the predetermined value $T_1$, the fuel injection modes switch from the first fuel injection mode to the third fuel injection mode. To the contrary, if the load on the engine 1 increases from a light load to a heavy load, the fuel injection modes switch from the third fuel injection mode to the first fuel injection mode.

At these timings of switching, too, enabling and disabling the compression stroke injection are changed, thus causing a steep change in the vaporization rate of the fuel injected into the cylinder 11. Specifically, FIG. 7 shows that, as the engine load decreases, the manifold vacuum increases. As a result, the vaporization rate rises, and the fuel augmentation rates are set to be gradually decreasing values. After that, when the charging efficiency Ce becomes equal to or lower than the predetermined value $Ce_1$, modes are switched from the first fuel injection mode in which split injections, including the intake stroke and compression stroke injections, are executed to the third fuel injection mode in which a single injection is executed during the intake stroke. Immediately after this timing of switching, the vaporization rate decreases steeply as described above. Hence, the fuel augmentation rate is increased steeply. Specifically, the fuel augmentation rates are switched discontinuously, thereby increasing the fuel injection amount, even though the engine load is decreasing. Such operations ensure a required vaporized fuel amount and reduce the torque shock. Even under a condition that the third fuel injection mode is executed, too, the vaporization rate rises as the engine load decreases. As a result, the fuel augmentation rates are set to be gradually decreasing values. To the contrary, when the engine load increases and the charging efficiency Ce exceeds the predetermined value $Ce_1$, the third fuel injection mode, in which a single injection is executed during the intake stroke, switches to the first fuel injection mode in which split injections, including the intake stroke and compression stroke injections, are executed. Immediately after the timing of switching, the vaporization rate increases steeply to the situation just described. Hence, the fuel augmentation rate is decreased steeply. That is to say, the fuel augmentation rates are switched discontinuously, thereby decreasing the fuel injection amount, even though the engine load is increasing. Such operations avoid creating an excessive amount of vaporized fuel, and reduce the torque shock.

Note that, according to the configuration described above, split injections, including the intake stroke and compression stroke injections, are executed in the first fuel injection mode, and split injections during the intake stroke alone, not the compression stroke injection, is executed in the second fuel injection mode. However, the split injections, including the intake stroke and compression stroke injections, may be executed in the second fuel injection mode. In addition, the ratio of the injection amount in the intake stroke injection to that in the compression stroke injection may be set differently between the first and second fuel injection modes. In particular, in the first fuel injection mode in which the vaporization rate of the fuel is relatively low, the injection amount in the compression stroke injection may be set to be greater than that in the intake stroke injection, and then the split injections, including the intake stroke and the compression stroke injections, may be executed. In the second fuel injection mode in which the vaporization rate of the fuel is relatively high, the injection amount in the intake stroke injection may be set to be greater than that in the compression stroke injection, and then the split injections, including the intake stroke and the compression stroke injections, may be executed.

Furthermore, the configuration described above is directed to FFV engines. Instead of FFV engines, the technique of the present disclosure is widely applicable to spark-ignition engines fed with a fuel containing an unconventional fuel such as alcohol.

Moreover, in addition to the fuel injection valve 53 of direct injection type, a fuel injection valve may further be provided to inject the fuel into the intake port.

DESCRIPTION OF REFERENCE CHARACTERS

1. Engine (Engine Body)
11. Cylinder
100 Engine Controller
53 Fuel Injection Valve (Fuel Feeder)
54 Fuel Feeding System (Fuel Feeder)

The invention claimed is:

1. A control device for a spark-ignition engine, the device comprising:
an engine body configured to run with a fuel including an unconventional fuel, of which the vaporization rate is lower, at or below a specific temperature, than that of the gasoline;
a fuel feeder configured to feed the fuel into a cylinder provided for the engine body; and
a controller configured to operate the engine body by controlling at least the fuel feeder, wherein
if the engine body is under a load greater than a predetermined load, the controller is configured to:
select a first fuel feeding mode in which a larger amount of the fuel is fed during a compression stroke than during an intake stroke if the engine body has a temperature which is equal to or below a predetermined temperature; and
select a second fuel feeding mode in which a larger amount of the fuel is fed during the intake stroke than during the compression stroke if the engine body has a temperature which is higher than the predetermined temperature,
the amount of the fuel to be fed by the fuel feeder is obtained by making an augmenting correction to a basic fuel feeding amount to be set based on a running state of the engine body, using a correction factor which has been set in advance based on a vaporization rate of the fuel, the vaporization rate being a ratio by weight of the fuel contributing to combustion to the fuel fed into the cylinder, and
in response to a fall in the vaporization rate immediately after a switch from the first fuel feeding mode to the second fuel feeding mode as the temperature of the engine body rises so much as to exceed the predetermined temperature, the controller is configured to set the correction factor immediately after the switch to be greater than that before the switch.

2. The device of claim 1, wherein
the controller selects the second fuel feeding mode if the load on the engine body is equal to or smaller than the predetermined load, in response to the fall in the vaporization rate when the switch is made from the first fuel feeding mode to the second fuel feeding mode as the load on the engine body decreases so much as to be equal to or below the predetermined load, the controller changes the correction factor into a greater value than that before the switch, and in response to a rise in the vaporization rate when the switch is made from the second fuel feeding mode to the first fuel feeding mode as the load on the engine body increases so much as to exceed the predetermined load, the controller changes the correction factor into a smaller value than that before the switch.

3. A control device for a spark-ignition engine, the device comprising:
an engine body configured to run with a fuel including an unconventional fuel, of which the vaporization rate is lower, at or below a specific temperature, than that of the gasoline;
a fuel feeder configured to feed the fuel into a cylinder provided for the engine body; and
a controller configured to operate the engine body by controlling at least the fuel feeder, wherein
if the engine body has a temperature which is equal to or below a predetermined temperature, the controller is configured to:
select a first fuel feeding mode in which a larger amount of the fuel is fed during a compression stroke than during an intake stroke if the engine body is under a load greater than a predetermined load; and select a second fuel feeding mode in which a larger amount of the fuel is fed during the intake stroke than during the compression stroke if the load on the engine body is equal to or smaller than the predetermined load, the amount of the fuel to be fed by the fuel feeder is obtained by making an augmenting correction to a basic fuel feeding amount to be set based on a running state of the engine body, using a correction factor which has been set in advance based on a vaporization rate of the fuel, the vaporization rate being a ratio by weight of the fuel contributing to combustion to the fuel fed into the cylinder, in response to a fall in the vaporization rate when a switch is made from the first fuel feeding mode to the second fuel feeding mode as the load on the engine body decreases so much as to be equal to or below the predetermined load, the controller is configured to change the correction factor into a greater value than that before the switch, and in response to a rise in the vaporization rate when the modes are switched from the second fuel feeding mode to the first fuel feeding mode as the load on the engine body increases so much as to exceed the predetermined load, the controller is configured to change the correction factor into a smaller value than that before the switch.

* * * * *